Dec. 11, 1962 J. T. ANDERSON 3,067,891
ARTICLE HANDLING APPARATUS AND SYSTEM
Filed Nov. 6, 1959 7 Sheets-Sheet 1

FIG.1.

INVENTOR
JOHN T. ANDERSON

BY Cushman, Darby & Cushman
ATTORNEYS

Dec. 11, 1962 J. T. ANDERSON 3,067,891
ARTICLE HANDLING APPARATUS AND SYSTEM
Filed Nov. 6, 1959 7 Sheets-Sheet 2

INVENTOR
JOHN T. ANDERSON

BY Cushman, Darby & Cushman
ATTORNEYS

Dec. 11, 1962

J. T. ANDERSON 3,067,891

ARTICLE HANDLING APPARATUS AND SYSTEM

Filed Nov. 6, 1959

INVENTOR
JOHN T. ANDERSON

BY Cushman, Darby & Cushman
ATTORNEYS

United States Patent Office 3,067,891
Patented Dec. 11, 1962

3,067,891
ARTICLE HANDLING APPARATUS AND SYSTEM
John T. Anderson, Orlando, Fla., assignor to Crown Cork & Seal Company, Inc., Orlando, Fla., a corporation of New York
Filed Nov. 6, 1959, Ser. No. 851,416
14 Claims. (Cl. 214—307)

The present invention relates to article handling apparatus and system and, more particularly, to structures and systems for handling unfilled packing cans.

This case is a continuation-in-part of John T. Anderson, application Serial No. 555,946, filed December 28, 1955, now Patent No. 2,928,522.

An important current problem in the can-making and can-filling industry arises from the fact that cans cannot be handled in accordance with the output of a can-making plant or the requirements of a can packing and closing plant without extremely expensive equipment or considerable labor cost. In somewhat more detail, some commonly used can-making machinery, that is, machinery to make a can body and place one end thereon, has an output of the order of two hundred cans a minute, while machines to fill the cans and then apply and seam the other end upon the can operate at a comparable speed. Very few packing plants, that is, filling and closing plants, are immediately adjacent a can-making plant and, therefore, a tremendous problem is involved at the can-making plant in packing the cans for transportation at such a rate as to keep pace with the output of the can-making machinery. The same problem arises when the cans reach the can-packing plant where they must be unloaded and positioned upright to move into the can-filling machinery.

By some methods now in use, cans are loaded at random in large open-bottom crates of a size comparable to that of a trailer truck body. When the truck reaches the packing plant, the crate is gradually withdrawn from the truck so that the cans will fall successively out of the open bottom of the crate into an unscrambling apparatus which places them upright for movement to a filling machine. A principal difficulty with this procedure is the cost of the unscrambling apparatus, bearing in mind that most can-packing plants operate only during a portion of the year.

Another system now in use is that of placing the cans at random in large bags which are transported and unloaded into an unscrambler at the packing plant.

While the matter of transporting cans in random fashion largely eliminates any careful handling of the cans at the can-making plant, nevertheless, as indicated above, it greatly increases the cost of the installation at the can-packing plant and can damage the open ends of the cans so that they become out of round, thereby affecting the seaming operation.

The prior systems discussed above only are practicable when the packing plant is located within fifteen to twenty miles of the can-making plant, so as not to require too many trucks. Where cans are to be moved over greater distances, and especially where the cans are of a size larger than six ounces, it is customary to stack the cans within a box car or truck, the stacking usually being performed by the use of large can handling forks and unloading being accomplished in the same manner. Can stacks in tiers will not require unscrambling apparatus, but manual labor in stacking and unstacking is a serious problem because it usually is necessary to employ at least two men to stack cans in a truck or car in pace with the output of one can-making machine.

An object of the present invention is to provide a carrier by means of which tin cans or other articles having characteristics generally similar to tin cans readily may be packed in orderly fashion, transported, and unloaded without any substantial degree of manual handling.

A still further object of the invention is to provide a discharge mechanism for use with the carrier of the invention.

A further object of the invention is to provide a carrier which will automatically discharge its load of cans or the like.

Another object of the invention is to provide a discharge mechanism for compartmented or cellular carriers and which will automatically successively empty the compartments.

Still another object of the invention is the provision of discharge station systems whereby trucks or other carriers, including the carriers of the present invention, readily can be handled for discharge of articles.

Another object of the present invention is to provide a discharge mechanism movable longitudinally of a take-off conveyor, the discharge mechanism being capable of receiving articles from carriers positioned along either side of the take-off conveyor.

A further object of the present invention is to provide a discharge mechanism for compartmented cellular carriers which will cooperate with the carrier to open the gate members of the carrier outlets.

Still another object of the present invention is to provide an unloading station for carriers whereby a single discharge mechanism may be utilized to receive articles from carriers such as trucks or the like positioned on either side of a take-off conveyor.

Still another object of the present invention is to provide a discharge mechanism for discharging circular articles such as cans or the like from a compartmented cellular carrier, the discharge mechanism including means to positively transfer the articles away from the outlet of the carrier to a position where they are transferred onto a take-off conveyor.

These and other objects and advantages of the present invention will be more apparent from the following specification, claims and accompanying drawings in which:

FIGURE 13 is an end view of the trailer shown in

FIGURE 12, the compartmented cellular carrier bin being omitted;

FIGURE 14 is a view taken on the line 14—14 of FIGURE 12;

FIGURE 15 is a side elevational view similar to FIGURE 12 showing a modified form of truck trailer;

Referring to the drawings wherein like character or reference numerals represent like or similar parts, FIGURES 1 to 3 and 7 to 11 disclose arrangements for discharging cans from an article carrier of the type disclosed and claimed in my copending application, Serial No. 862,612, filed December 29, 1959, now abandoned. In more detail, the carrier generally indicated at 20 is of the type having a plurality of cells separated by partitions. Discharge outlets or openings 42 are provided for each cell 34, the discharge outlets being horizontally arranged adjacent the lower portion of at least one side of the carrier. The carrier 20 can be loaded with cans by the mechanism described and claimed in my copending application, Serial No. 555,946, filed December 28, 1955, now United States Patent 2,928,522, issued March 15, 1960.

Figures 2, 3, 4:
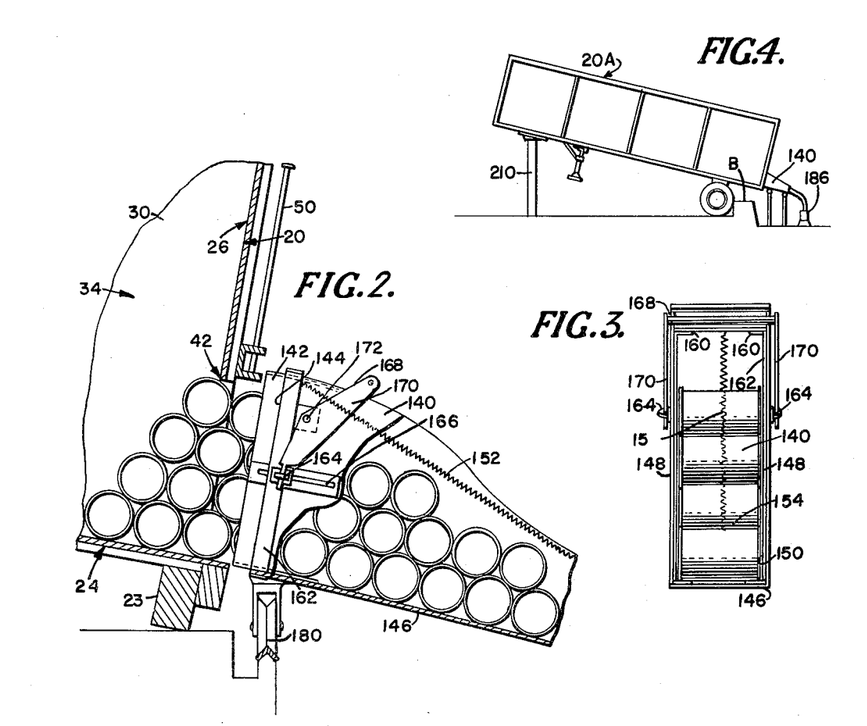
FIGURE 2 is a fragmentary detail showing the discharge element of FIGURE 1 but with the carrier included.
FIGURE 3 is an end view of the discharge element of FIGURE 2.
FIGURE 4 is a view on a reduced scale showing a procedure for unloading carriers.

As best illustrated in FIGURE 2, when a carrier is to be discharged, it will be placed in discharge relationship with a discharge chute 140. By discharge relationship is meant either aligning the chute 140 with one of the cells 34 of a carrier and opening the closure element 50 of that cell, or, if the carrier is provided with a flat non-inclined bottom wall, placing the carrier in such position that its bottom wall is slightly tilted. The degree of inclination necessary to discharge the six ounce cans under discussion need only be about two-and-a-half inches per foot. At this inclination, six ounce cans will discharge at the rate of two thousand per minute simply by gravity flow.

Referring now to the discharge chute 140 it will be observed that it is fitted with a bridging slide 142 adapted to close the space between the infeed end 144 of the chute body and the adjacent edge of the carrier discharge opening 42. Referring first to the body of the discharge chute, it is of U-shaped section to include a bottom wall 146 and side walls 148, the top being open. It will be observed that the infeed end 144 of the chute body is of a height corresponding to the diameter of several of the cans being handled, so that the cans will be quite free to move into the discharge chute. The outfeed end 150 is of a height only slightly greater than the diameter of a can being handled, so that only one can may move therefrom at a time. In actual practice, the cans move from the outfeed end 150 with sufficient rapidity that even though four cans simultaneously may be moving into the infeed of the chute 140, their movement from the outfeed end 150 will prevent any pile-up of cans in the chute 140. However, in order to avoid any pile-up of cans in chute 140 and also to urge the cans into one tier at outfeed end 150, a coil spring 152 may be provided to extend between a crossbar at the infeed end of the discharge chute to a crossbar 154 above the discharge end 150 of the chute.

Referring now to the slide bridge 142, this is of U-shaped form to fit within the infeed end 144 of chute 140, the top of the bridge being open except for an inturned flange 160 extending from each side wall 162. Each side wall of the slide bridge 142 has an apertured ear 164 fixed thereto and extending outwardly through a slot 166 in the side wall 148 of the chute body 140. A handle 168 of U-shaped form to include side pieces 170 has each side piece pivoted on a pin 172 extending outwardly from the corresponding side wall 148 of chute 140. The free ends of the handle side pieces 170 are slidably engaged in the ears 164. By this arrangement, swinging movement of the handle 168 will cause the slide bridge 142 to move with respect to the discharge chute 140 and an adjacent carrier 20 to close any gap between the two.

Figure 1:
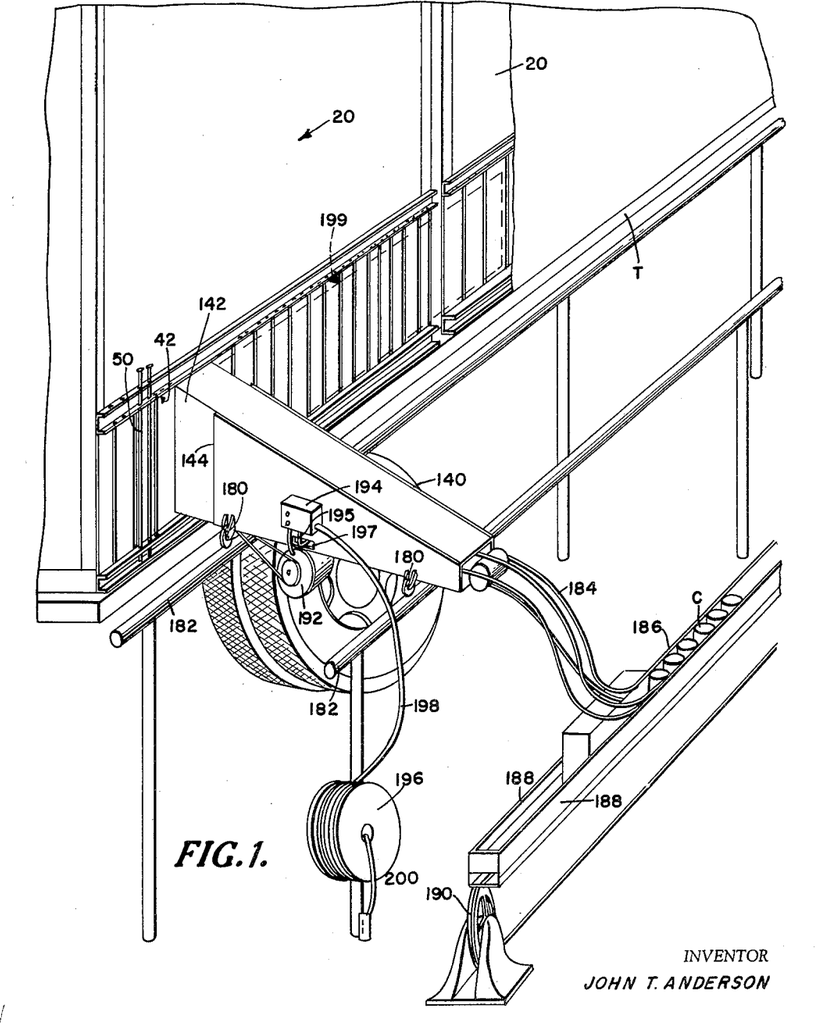
FIGURE 1 is a perspective view of the present invention showing a novel apparatus by means of which articles may be removed from the carrier of the present invention.

As best illustrated in FIGURE 1, the discharge chute 140 is provided with pairs of rollers 180 adapted to ride on a trackway 182 at a receiving plant. For example, a truck or truck-trailer generally designated T of flat body type carrying three or four carriers 20 may draw up alongside the rails 182. The operator may position the sliding bridge 142 diagrammatically shown in FIGURE 1 to close any gap between the infeed end 144 of the discharge chute 140 and the adjacent discharge opening 42 of the carrier. Then the closure device 50 may be removed from the discharge opening 42 of the cell 34 with which the discharge chute 140 is aligned and the cans will move into the chute 140.

The outfeed end of discharge chute 140 may have can guiding strips or rails 184 secured thereto and which are so shaped as to cause the cans to spiral from a horizontal position to a vertical position. The spiraling guide 184 will be fixed to the discharge chute and is slidably supported above a driven conveyor 186 on which the spiral will place the cans in upright position. Because the spiral guide 184 is slidably related to the fixed vertical guide plates 188 of conveyor 186, as one cell of carrier 20 is emptied, discharge chute 140 and the attached spiral 184 may be moved along the conveyor 186 to feed cans to the latter at some point between its idler pulley 190 and its opposite and driven end. As cans flow from spiral guide 184 they will be moved away by conveyor 186.

Conveyors of the type indicated at 186 are conventional equipment at the can receiving platform or area of a packing plant and are adapted to receive cans placed therein by various conventional feeding means. For example, by prior practice, the cans have been placed upright in the usual conveyor 186 by an apparatus known as an unscrambler and into which cans have been dumped at random, conveyor 186 then moving the cans to filling and seaming apparatus. Therefore, the structure shown in FIGURE 1 primarily involves elimination of the unscrambler from the packing plant and the substitution of the track rails 182, discharge chute 140 and its accompanying spiral 184. These parts need be the only new permanent equipment provided at the packing plant, the cans being delivered to the packing plant by the carriers such as 20 supported on trucks.

If desired, discharge chute such as 140 may be used to deliver the cans from a portable carrier such as has been heretofore discussed, the chute 140 then feeding the cans into the top of a less portable and larger bin or carrier of the same structure as the carrier 20 and which larger carrier is permanently installed at the packing plant. But such an arrangement, cans could be delivered to the packing plant in portable carriers 20 at any desired time and place in the permanent carrier or bin for a reserve stock. Then, when it is desired to fill the cans, the permanent bin could discharge its cells into the conveyor 186.

In order that cells may be discharged as rapidly as possible, an electric motor 192 may be mounted on the underside of the chute 140, motor 192 being adapted to drive wheels, not shown, to engage the rails 182. In addition, automatic switch means 194 may be connected to motor 192, switch mechanism 194 being powered by current supplied from a reel 196 through a flexible conductor 198, the other end of conductor 198 being connected to a source of power 200. The switch mechanism 194 may include a pivoted arm such as 195 extending through a slot 197 in the side wall of chute 140. When the operator starts the flow of cans from the first cell, he may close a manual switch in circuit with the switch controlled by arm 195. As long as cans move through the chute 140 the circuit will remain open but when the movement of cans from one cell 34 ceases, arm 195 will close the circuit to motor 192 and it will be powered to drive the chute 140 to the next cell. The power could be cut off either by a trip on the cell or by means responsive to a given drive period of the motor 192. In order to render the entire discharge operation automatic, a vane or stop plate such as shown in dotted lines at 199 in FIGURE 1 could extend from one side wall of the infeed edge 144 of chute 140 or from the side edges of the bridge slide 142. In such case, all of the gate pins 50 of a carrier 20 may be removed at the same time so that cans will discharge from a cell 34 as soon as discharge chute 140 has moved into alignment therewith.

In more detail, assume that in FIGURE 1 the first cell emptied in the one shown at the left of the figure, and that the sliding bridge 142 has a plate 199 extending from its right-hand side to fully cover and close the discharge apertures 42 of all of the other cells. With this arrangement, as soon as the carrier 20 is brought into contact with discharge chute 140 all of the closure pins 50 may be lifted from the apertures 42 because the plate 199 will close all of the cells 34 except the one at the extreme left. As soon as all cans are discharged from the left-hand cell and such discharge stops, switch mechanism 194 may operate as described above to power the motor 192 to move the discharge chute 140 and sliding bridge 142 into alignment with the next cells to the right because, with all of the closures 50 removed, each cell will discharge in succession without further attention on the part of an operator.

FIGURE 4 shows a procedure which may be followed if the entire body 20a of a truck trailer is built in accordance with the cellular carrier structure of the present invention. Such a body 20a is shown in top elevation in FIGURE 5, from which it will be noted that the cells 34a are formed by partition elements 30a extending the entire length of the truck trailer. The procedure illustrated in FIGURE 4 involves backing the rear wheels of the truck up against a barrier B to thereby bring the rear ends of the cells 34 adjacent a discharge chute 140 combined with a conveyor 186 as shown in FIGURE 1. The outfeed end of the carrier 20a may be of the same form as illustrated on the smaller carriers heretofore discussed and each cell 34a thereby may be successively discharged to the conveyor 186 or to a permanent bin also of the cellular type disclosed herein.

Figure 5:
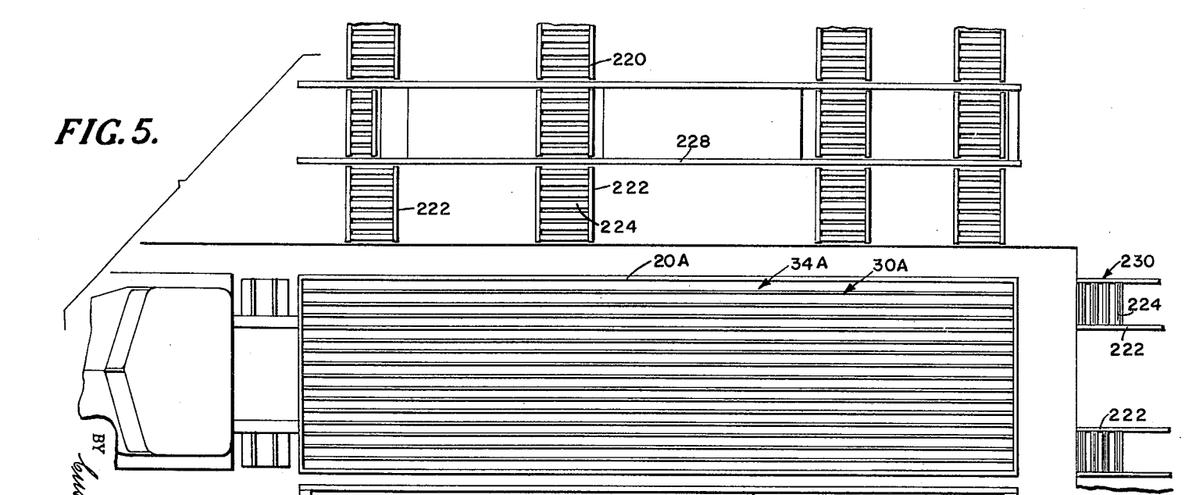
FIGURE 5 is a top plan view showing a system and station for unloading carriers of the invention.

A conventional truck trailer of the construction illustrated in FIGURE 5 could accommodate from one hundred and sixty thousand to two hundred thousand six ounce cans of the type discussed above.

It will be noted from FIGURE 4 that the truck trailer body 20a has been disconnected from its tractor after being positioned above a vertically movable hydraulically operated piston 210. With the body 20a provided with a flat bottom rather than an inclined bottom operation of the piston 210 will raise the truck to the proper angle to cause its cells to be discharged.

FIGURE 5 discloses a handling station for truck trailer bodies which are constructed in accordance with the present invention. The truck provided with the carrier 20a is shown positioned alongside a platform generally designated 220 and including a plurality of skidways 222 formed of rotatable rolls 224. By suitable means, the body 20a may be moved laterally off the supporting frame 226 of the truck so that it will stand upon the four skidways 222 of platform 220. Then a vertically movable frame 228 of sufficient size to support the carrier 20a may be elevated in such a manner as to cause the carrier 20a to be tilted to the relationship shown in FIGURE 4. It will be understood that a discharge mechanism such as shown in FIGURE 4 then will be provided at the right end of the platform 220.

Figure 6:
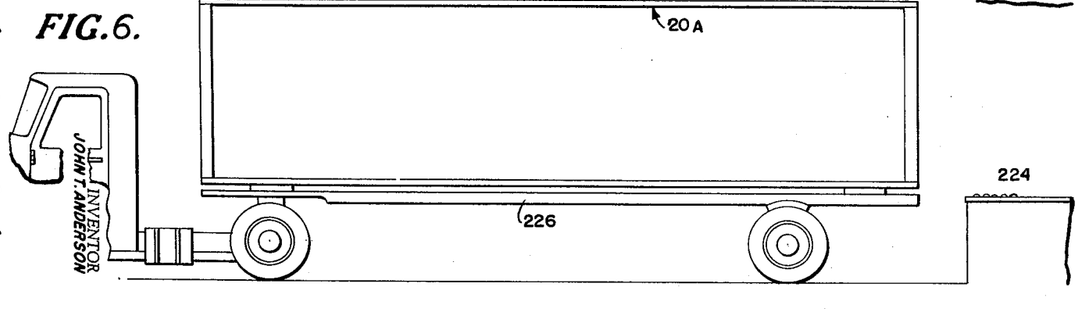
FIGURE 6 is a side elevation of the equipment of FIGURE 5.

FIGURE 5 also indicates a second platform 230 against which a truck provided with a carrier body 20a could be backed. Then the carrier 20a may be moved to the right as viewed in FIGURE 6 and on to the platform 230, which is of the same design as 220 but has its skidways arranged longitudinally of the carrier 20a to be supported thereon. Then carrier 20a can be tilted or otherwise arranged for discharge of cans.

It will be observed that when the platforms 220 and 230 are combined as shown in FIGURE 5, a truck may place its carrier 20a on the platform 220 and then return to the can plant for a second filled carrier 20a. The second carrier 20a may be positioned upon the platform 230. Assuming that the first carrier at platform 220 now has been emptied, it can be replaced upon the truck and taken back to the can plant for refilling. In this way, two carriers 20a and one truck may provide a continuous supply of cans for a packing plant without any manual handling of cans or carriers or the use of any unscramblers.

It will be understood that the platform 230 will have discharge equipment of the type illustrated in FIGURE 1 at its right-hand end, not shown.

It will be noted that the carrier such as 20 could be positioned by a fork truck upon a fixed platform alongside the discharge mechanism illustrated in FIGURE 1. If the carrier is of the flat bottom type, the fixed platform might be provided with either portable or fixed jacks to tilt the carrier to the proper angle to cause the contents to discharge into chute 140. If the carrier is of the type shown at 20a in FIGURES 5 and 6, that is, is of the size of a truck body or other large vehicle and has its cells flat-bottomed and extending the entire length of the carrier, elevating means could be provided on the truck to tilt the carrier. If carriers of the smaller size are mounted upon a truck body so that the cells extend transversely of the truck, the individual carriers also could be tilted by power means on the truck if the carrier bottoms are of the flat type.

Referring now to FIGURES 7 through 11 inclusive, a modified form of article discharge chute 140a is shown in discharge relationship with a carrier 20b. The discharge chute 140a is shown in relationship with a carrier that has its bottom wall slightly tilted from its normal flat non-inclined position by tilting of the entire trailer.

Figure 7:
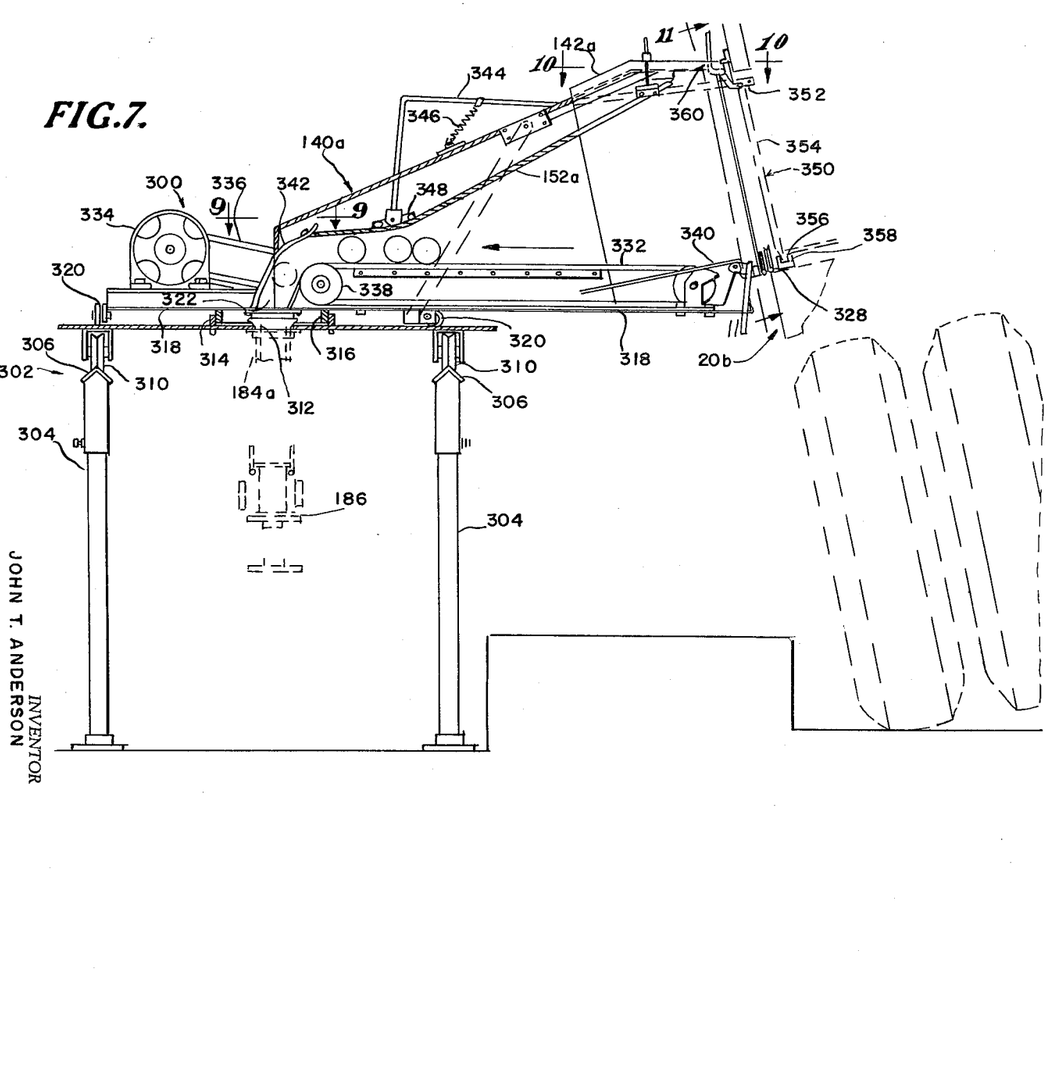
FIGURE 7 is a fragmentary detail partly in section and partly in elevation showing a modified form of discharge element cooperating with a carrier of the present invention.
Figures 8, 9:
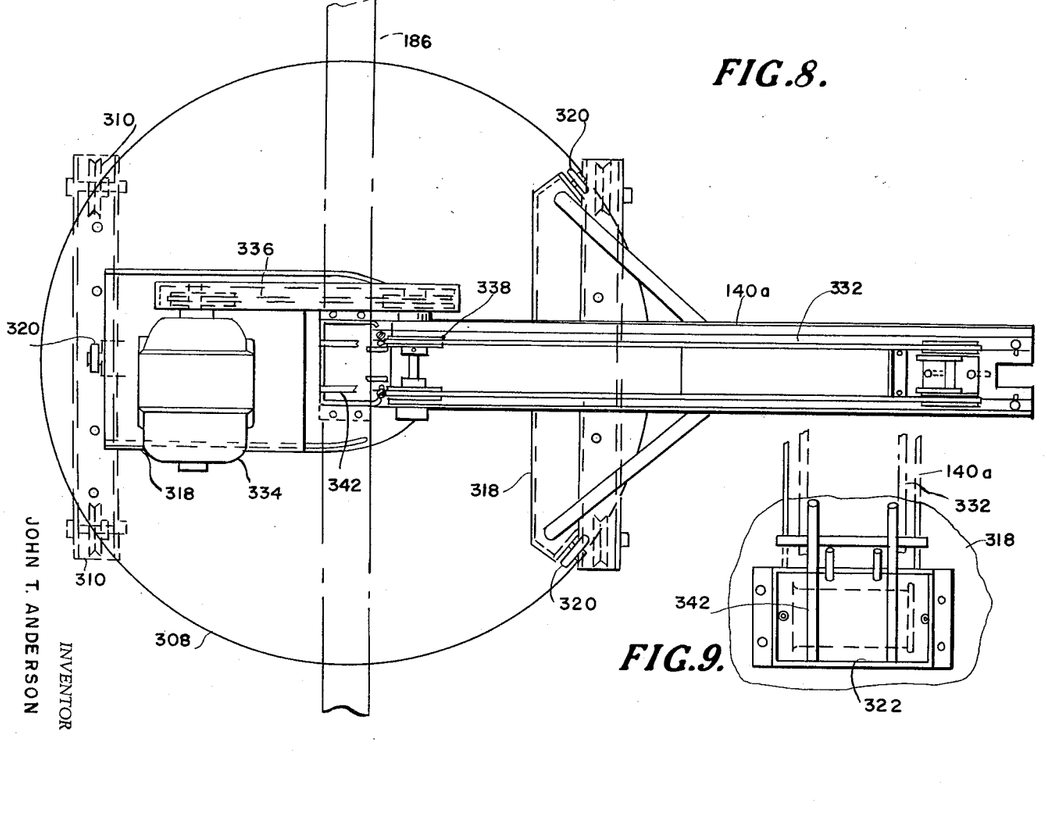
FIGURE 8 is a top plan view of the discharge element shown in FIGURE 7.
FIGURE 9 is a fragmentary bottom plan view taken on the line 9—9 of FIGURE 7.

The discharge chute 140a forms a part of a discharge mechanism generally indicated by the numeral 300 which is adapted to cooperate with and deliver cans to the driven conveyor 186. The discharge mechanism includes a trackway 302 mounted on suitable standards 304, the trackway comprising a pair of spaced rails 306 extending above and along each side of the conveyor 186. A turntable 308 having a pair of wheels 310 cooperating with each of the rails 306 is adapted to move along the rails above the conveyor 186. Turntable 308 is provided with a center rectangularly shaped opening 312 and a spiral guide 184a is fixed thereto and is adapted to convey cans discharged through the opening onto the conveyor 186 in an upright position.

The substantially horizontal upper surface of turntable 308 is provided with an annular collar 314 which is adapted to cooperate with a downwardly depending annular collar 316 mounted on the lower surface of a base structure 318 of discharge chute 140a. Rollers 320 suitably carried on the base structure 318 support the base structure for rotation on the surface of turntable 308. As is now evident, the annular collar 314 and 316 cooperate so that the base structure can make a complete 360° rotation on the turntable 308. Base structure 318 is provided with an opening 322 which is rectangular in shape and aligned with the opening 312 in the turntable 308.

The discharge chute 140a is provided with a slide bridge 142a which fits over the infeed end of the chute. The slide bridge 142a is provided with pairs of rollers 324 and 326 which are adapted to roll between the trackway defined by the rails 328 and 330 mounted on the carrier 20b above and below its series of outlets.

Mounted within the discharge chute 140a and providing the bottom wall of the same is an endless conveyor element 332 which has its upper run extending from the infeed end of the chute toward the outlet end of the chute. The endless conveyor 332 is positively driven by an electric motor 334, carried on the base structure 318, through a pulley belt 336 which is adapted to drive the pulley 338.

An infeed guide 340 insures a smooth transfer of cans from the cells of the carrier 20b to the conveyor 332. Conveyor 332 feeds the cans on their sides one at a time to a discharge guide 342. A coil spring 152a is provided between the discharge guide 342 and the infeed of chute 140a so that cans are urged into one tier at an outfeed end of the conveyor 332. To assist in urging the cans into a single tier, an arm 344 carried by the top wall of the chute 140a is spring urged downwardly on the coil spring 152a by a spring 346. The arm 344 is provided with a shoe 348 pivotally connected thereto and as is now evident, cans flowing from the right to the left of FIGURE 7 will be urged into a single tier as they pass from under the influence of the conveyor 332 to the discharge guide 342.

Figures 10, 11:
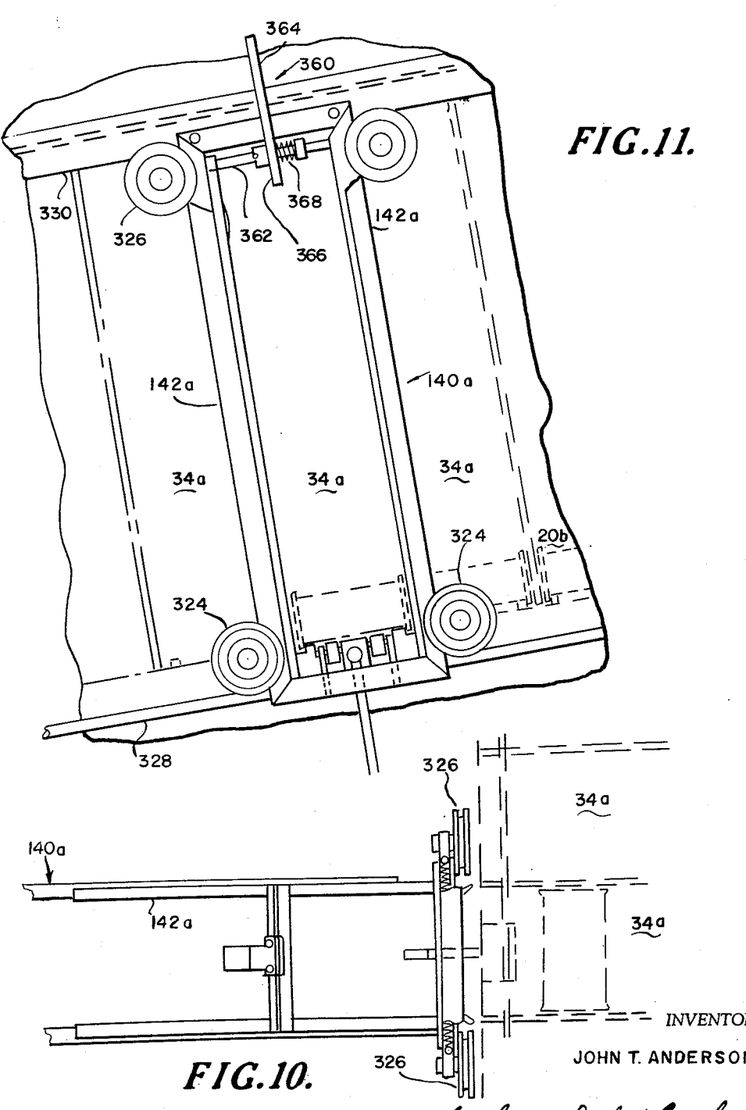
FIGURE 10 is a fragmentary plan view taken on the line 10—10 of FIGURE 7 and showing the discharge element cooperating with the carrier.
FIGURE 11 is a sectional view taken on the line 11—11 of FIGURE 7.

Referring now to FIGURES 7, 10 and 11, a novel form of gate structure 350 is provided for each bin or cell of the carrier 20b. The gate structure 350 includes a link 352 pivoted to the carrier adjacent the upper portion of the discharge opening or outlet, and a gate member 354 pivoted to the link and having its lower end 356 retained in a channel shaped member 358 which extends longitudinally of the carrier. When the link 352 is pivoted in a clockwise direction, it will lift the gate member 354 upwardly so that its lower end 356 disengages the retaining member 358. Once the lower end 356 is free of member 358, the member 354 can pivot outwardly into the discharge chute 140a and cans can flow through the outlets of the cells of carrier 20b.

A latch mechanism 360 carried by the bridging slide 142a pivots on a transverse rod 362 and is adapted to engage the link 352. In more detail, the latch mechanism 360 includes a handle 364 and an extension 366 for engaging the link 352. A spring 368 carried on the rod 362 normally urges the handle and its link engaging extension 366 in a clockwise direction out of engagement with the link 352. Once the handle 364 is pulled in a counterclockwise direction as viewed in FIGURE 7, it will cause the release of the gate member 350 and cans can flow from the carrier onto the conveyor 332 in chute 140b where they are transferred to the chute 184a and onto the conveyor 186.

Figure 12:
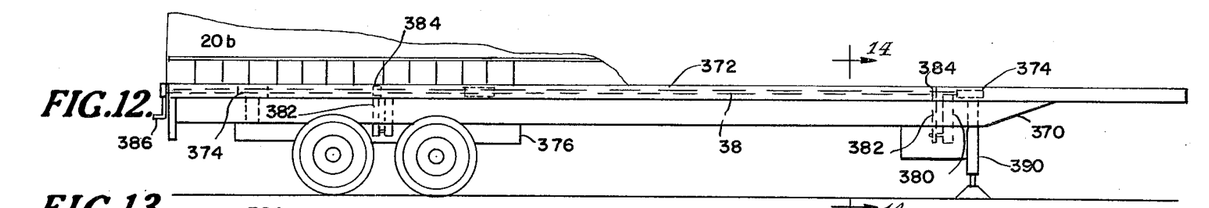
FIGURE 12 is a fragmentary side elevational view of a truck trailer carrier, the trailer bed being capable of tilting with respect to the trailer base.
Figures 13, 14, 15:
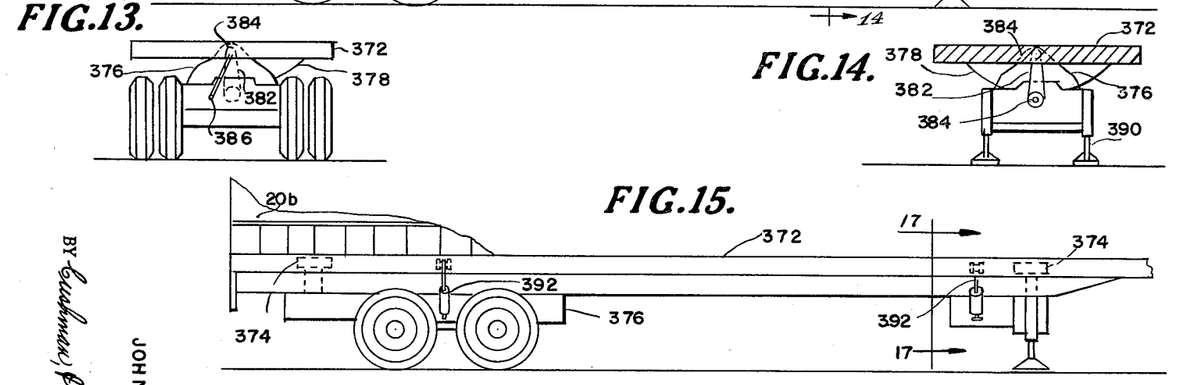

Referring now to FIGURES 12 through 14, a truck trailer generally indicated at 370 is adapted to support the carrier bins 20b for transportation from the can-making plant to the cannery. Rather than lifting the trailer as shown in FIGURE 4 or tilting the entire trailer as shown in FIGURE 7, the bed 372 of the trailer may be pivotally mounted as indicated at 374 to the trailer frame 376. The trailer bed is provided with a spur gear segment 378 which cooperates with a pinion 380. The pinion 380 may be rotated by a chain and sprocket 382 and 384 respectively which is actuated by a crank 386. It will be understood that the crank turns a shaft 388 extending longitudinally of the trailer frame and in which one of the sprockets 384 of each pair of sprockets is mounted. The usual standards 390 may be provided to support the front end of the trailer when the tractor for the trailer is removed.

Figure 16:
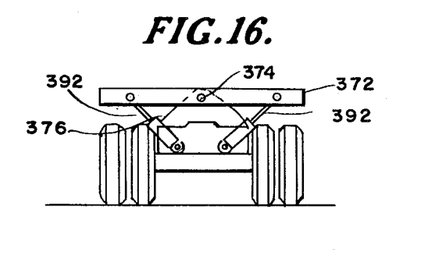
FIGURE 16 is an end view of the trailer shown in FIGURE 15.
Figure 17:
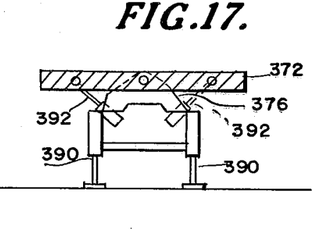
FIGURE 17 is a view taken on the line 17—17 of FIGURE 15.

FIGURES 15 to 17 show a modified version of tilting trailer utilizing hydraulically operated pistons 392 which are adapted to tilt the trailer bed 372. In this embodiment, the trailer bed 372 is pivotally connected at 374 to the trailer frame 376 in a similar manner as heretofore described. Extension of the pistons 392 on one side of the trailer and retraction of the pistons 390 on the other side of the trailer will cause the bed 372 to tilt.

The terminology used in this specification is for purpose of description and not of limitation, the scope of the invention being indicated in the following claims.

I claim:
1. In combination, a carrier for circular articles, said carrier including a plurality of article outlets, longitudinally movable conveyor means, an article receiving chute having an inlet portion adapted to be associated with said carrier outlets and an outlet portion adapted to be associated with said conveyor means, said article receiving chute having its inlet portion swingable about a substantially vertical axis while its outlet portion remains associated with said conveyor means whereby the inlet portion is capable of receiving articles from the carrier outlets when said carrier is positioned on either side of said conveyor means, and said article receiving chute being movable along the length of said conveyor means and successively associated with said plurality of article outlets so as to guide an article from a carrier outlet to said conveyor means.

2. A combination of the character described in claim 1 including resilient means in said article receiving chute for permitting only one article at a time to be discharged onto said conveyor means out of the outlet portion of said chute.

3. A combination of the character described in claim 1 including movable conveyor means within said article receiving chute, said movable conveyor means being adapted to move articles from the inlet portion of said chute toward the outlet portion of said chute.

4. For use in unloading circular articles from a carrier having a plurality of outlets horizontally arranged in series and discharging the articles onto a longitudinally movable conveyor means, an article receiving chute having a substantially vertical inlet portion for cooperating successively with the series of outlets in the carrier and a substantially horizontal outlet portion for discharging the articles onto said conveyor means, means to move said chute longitudinally with respect to the conveyor means and means to rotate said chute on a substantially vertical axis through said outlet portion.

5. For use in unloading circular articles from a carrier positioned along side of a longitudinally movable conveyor means and having a plurality of outlets horizontally arranged in series parallel to the longitudinally movable conveyor means, an article unloading device comprising a trackway, a turntable mounted on said trackway for movement over the longitudinal conveyor means and parallel to the article carrier, and an article receiving chute mounted on said turntable and rotatable with respect thereto on a vertical axis, said chute having an inlet portion for cooperating with the series of outlets on said carrier and an outlet portion for cooperating with said movable conveyor means.

6. An article unloading device of the character described in claim 5 including movable conveyor means mounted within said chute for moving articles from the inlet portion of said chute toward the outlet of said chute.

7. An article unloading device of the character described in claim 5 including resilient means extending from adjacent the inlet portion of said chute to adjacent the outlet portion of said chute, said resilient means permitting only one article at a time to be discharged through said outlet portion.

8. An article unloading device of the character described in claim 5 including movable conveyor means mounted within said chute for moving articles from the inlet portion toward the outlet portion, and means to operate said last-mentioned movable conveyor means, said operating means including an electric motor operatively carried on said chute and rotatable with said chute.

9. In combination, a carrier for circular articles, said carrier having a plurality of outlets horizontally arranged in series, closure means for each of said outlets, each of said closure means including a link pivoted to said carrier adjacent the upper portion of an outlet and an elongated gate member pivoted at its upper end to said link member, means on said carrier for normally engaging the lower end of said elongated member to retain said member in position closing said outlet, a longitudinally movable conveyor means, an article receiving chute having an inlet portion adapted to be successively associated with said carrier outlets and an outlet portion adapted to be associated with said conveyor means, said article receiving chute having its inlet portion swingable about a substantially vertical axis while its outlet portion remains associated with said conveyor means whereby the inlet portion is capable of receiving articles from the carrier outlets when said carrier is positioned on either side of said conveyor means, said article receiving chute being movable along the length of said conveyor means so as to successively cooperate with said outlets of said carrier, and means on said chute cooperating with said link to pivot the same upwardly whereby said gate member disengages said retaining means and is free to pivot outwardly into said chute.

10. In an unloading station for unloading circular articles from a carrier of the type having a plurality of horizontally disposed article discharge outlets, an article take-off conveyor, a trackway, a turntable movable on said trackway above said take-off conveyor, a chute mounted on said turntable and movable with respect thereto whereby it may cooperate with carriers positioned on either side of said take-off conveyor, said chute having an inlet for cooperating successively with the outlets of a carrier and an outlet for discharging articles onto said conveyor.

11. An unloading station of the character described in claim 10 wherein said chute includes movable conveyor means carried within the same for transferring articles from its inlet portion and to its outlet portion.

12. In combination, a carrier for circular articles, said carrier being provided with a plurality of outlets arranged in a series, a discharge chute having an inlet opening movable along the series of outlets and an outlet opening, and means carried by said chute and coacting with outlets on said carrier out of registry with said chute for maintaining the same closed, said last-mentioned means including a plate element extending from one side of said chute in a plane of the inlet opening of said chute and in a direction parallel to movement of said chute along the series of outlets.

13. A combination of the character described in claim 12 including motor means carried by said chute for moving said chute along the outlets, and means carried by said chute and responsive to absence of articles in said chute for energizing said motor means to move the chute to another opening.

14. In combination, a carrier for circular articles having side walls and a bottom wall, at least one of said side walls having a plurality of outlets horizontally arranged in series therealong adjacent the bottom wall, means carried by the carrier and individually closing each of said outlets, said means being selectively operable to open at least one selected outlet, means to tilt said carrier so that its bottom wall tilts downwardly toward said discharge outlets, a discharge chute movable along the series of outlets, said discharge chute having an inlet opening and an outlet opening, means carried by said discharge chute for blocking outlets of said carrier out of registry with the discharge chute when the closing means for the outlets of said carrier are operable to open the same, and a conveyor positioned substantially parallel to the series of outlets of said carrier, said conveyor being adapted to receive the articles from the outlet portion of said chute.

References Cited in the file of this patent

UNITED STATES PATENTS

| | | |
|---|---|---|
| 699,690 | Leetham | May 13, 1902 |
| 1,387,309 | Prater | Aug. 9, 1921 |
| 1,411,811 | Smith | Apr. 4, 1922 |
| 1,597,465 | Hepperle | Aug. 24, 1926 |
| 2,439,075 | Christiansen | Apr. 6, 1948 |
| 2,623,652 | Byington | Dec. 30, 1952 |
| 2,659,504 | Kranawetvogel et al. | Nov. 17, 1953 |
| 2,727,641 | Tomkins | Dec. 20, 1955 |
| 2,893,594 | Burt | July 7, 1959 |